(12) United States Patent
Wei (10) Patent No.: US 10,148,463 B2
(45) Date of Patent: Dec. 4, 2018

(54) METHOD AND DEVICE FOR ESTIMATING FREQUENCY OFFSET

(71) Applicant: ZTE CORPORATION, Shenzhen, Guangdong Province (CN)

(72) Inventor: Jidong Wei, Shenzhen (CN)

(73) Assignee: XI'AN ZHONGXING NEW SOFTWARE CO., LTD., Xi'An, Shaanxi (CN)

( * ) Notice: Subject to any disclaimer, the term of this patent is extended or adjusted under 35 U.S.C. 154(b) by 0 days.

(21) Appl. No.: 15/756,587

(22) PCT Filed: May 25, 2016

(86) PCT No.: PCT/CN2016/083351
§ 371 (c)(1),
(2) Date: Mar. 1, 2018

(87) PCT Pub. No.: WO2017/036193
PCT Pub. Date: Mar. 9, 2017

(65) Prior Publication Data
US 2018/0183627 A1 Jun. 28, 2018

(30) Foreign Application Priority Data
Sep. 1, 2015 (CN) .......................... 2015 1 0552924

(51) Int. Cl.
*H04B 17/00* (2015.01)
*H04W 24/00* (2009.01)
(Continued)

(52) U.S. Cl.
CPC ....... *H04L 25/0228* (2013.01); *H04B 1/7103* (2013.01); *H04L 25/0218* (2013.01);
(Continued)

(58) Field of Classification Search
CPC .. H04B 7/0413; H04B 7/0452; H04B 10/548; H04B 10/6164; H04W 56/00;
(Continued)

(56) References Cited

U.S. PATENT DOCUMENTS

| 7,308,033 B2* | 12/2007 | Yu ..................... H04L 25/03159 375/260 |
| 8,149,947 B2* | 4/2012 | Casamajou ......... H04L 27/2647 375/260 |
| 8,649,447 B2* | 2/2014 | Mohebbi ............... H04L 5/0023 375/259 |

(Continued)

FOREIGN PATENT DOCUMENTS

| CN | 101902249 A | 12/2010 |
| CN | 102369707 A | 3/2012 |

(Continued)

*Primary Examiner* — Quochien B Vuong
(74) *Attorney, Agent, or Firm* — Ling Wu; Stephen Yang; Ling and Yang Intellectual Property (57) ABSTRACT

The present disclosure discloses a method and apparatus for estimating a frequency offset. The method includes: reconstructing an estimated channel value of a target user and an estimated channel value of a non-target user to obtain a reconstructed estimated channel value of the target user and a reconstructed estimated channel value of the non-target user; calculating frequency domain received data of a target user's local pilot frequency at which interference has been cancelled by using frequency domain data of a subcarrier occupied by the target user, frequency domain data of a subcarrier occupied by the adjacent non-target user, and the reconstructed estimated channel value of the target user and the reconstructed estimated channel value of the non-target user; and determining an estimated frequency offset value by using the target user's local pilot frequency at which interference has been cancelled and the frequency domain received data.

19 Claims, 5 Drawing Sheets

(51) Int. Cl.
    *H04L 25/02*    (2006.01)
    *H04B 1/7103*   (2011.01)
    *H04L 27/00*    (2006.01)
    *H04L 27/26*    (2006.01)
    *H04W 56/00*    (2009.01)

(52) U.S. Cl.
    CPC ...... *H04L 27/0014* (2013.01); *H04L 27/2657* (2013.01); *H04L 27/2672* (2013.01); *H04L 27/2675* (2013.01); *H04L 27/2695* (2013.01); *H04W 56/0035* (2013.01)

(58) Field of Classification Search
    CPC ............. H04W 56/0035; H04L 5/0048; H04L 25/0204; H04L 27/26; H04L 27/2657
    USPC ..... 455/67.11, 255; 370/208, 252, 343, 464, 370/480, 491
    See application file for complete search history.

(56) References Cited

U.S. PATENT DOCUMENTS

| | | | |
|---|---|---|---|
| 8,774,034 B2 * | 7/2014 | Li | H04L 27/2695 370/252 |
| 2009/0323515 A1 * | 12/2009 | Ishikura | H04L 5/0007 370/210 |
| 2011/0244807 A1 | 10/2011 | Yoon et al. | |

FOREIGN PATENT DOCUMENTS

| | | | |
|---|---|---|---|
| CN | 102457463 A | 5/2012 | |
| GB | 2447972 A | 10/2008 | |

* cited by examiner

METHOD AND DEVICE FOR ESTIMATING FREQUENCY OFFSET

TECHNICAL FIELD

The present disclosure relates to, but is not limited to, the field of communication, and more particularly, to a method and apparatus for estimating a frequency offset.

BACKGROUND

The new generation mobile communication system is required to have multimedia data transmission capabilities of high rate, high spectral efficiency and high capacity. Serious frequency-selective fading will occur in high speed data transmission in the wireless environment, while the Orthogonal Frequency Division Multiplexing (OFDM) technology stands out due to its prominent advantages and becomes the focus of attention.

The OFDM is a multi-carrier transmission technology in which subcarriers are mutually orthogonal. The OFDM divides one wider transmission bandwidth into mutually orthogonal multiple subcarriers for parallel transmission of data. The OFDM has advantages, such as high frequency spectrum utilization, anti-multipath fading, simple implementation of the Multiple-Input Multiple-Output (MIMO) technology and so on. However, because the OFDM technology requires the characteristic of mutual orthogonality between the subcarriers, it is very sensitive to the frequency offset.

In the OFDM technology, the existence of the time offset will cause inter-symbol interference (ISI), thereby influencing on the precision of frequency offset estimation. Although the influence of the time offset on the OFDM is reduced to some extent due to the introduction of a concept of cyclic prefix into the OFDM, it is required to ensure that the time offset cannot be too big; otherwise, the data will be seriously disturbed, causing the loss of performance.

It can be seen that the synchronization issue is one of core issues of the OFDM technology. A variety of synchronous solutions have been proposed by a lot of communication engineers for decades. If a frequency offset estimation method for continuous pilot symbols continues to be used for estimating a frequency offset for comb pilot symbols, the loss of estimation precision will be relatively large. However, there is no pertinent literature describing how to estimate a frequency offset by using discontinuously distributed pilot symbols, such as comb-distributed pilot symbols, and ensure that there is no loss with respect to the continuously distributed pilot symbols.

SUMMARY

The following is a summary of the subject matter described herein in detail. This summary is not intended to limit the protection scope of the claims.

The object of the present disclosure is to provide a method and apparatus for estimating a frequency offset to better solve the problem of how to estimate the frequency offset by using discontinuously distributed pilot symbols, such as comb-distributed pilot symbols, and so on.

A method for estimating a frequency offset includes:

reconstructing an estimated channel value of a target user and an estimated channel value of a non-target user to obtain a reconstructed estimated channel value of the target user and a reconstructed estimated channel value of the non-target user;

calculating frequency domain received data of a target user's local pilot frequency at which interference has been cancelled by using frequency domain data of a subcarrier occupied by the target user, frequency domain data of a subcarrier occupied by an adjacent non-target user, and the reconstructed estimated channel value of the target user and the reconstructed estimated channel value of the non-target user; and determining an estimated frequency offset value by using the target user's local pilot frequency at which interference has been cancelled and the frequency domain received data.

In an exemplary embodiment, reconstructing an estimated channel value of a target user and an estimated channel value of a non-target user to obtain a reconstructed estimated channel value of the target user and a reconstructed estimated channel value of the non-target user includes:

calculating an estimated channel value of a resource occupied by the adjacent non-target user by using the estimated channel value of the target user in a resource block occupied by the target user, and determining the reconstructed estimated channel value of the target user by using the estimated channel value of the target user and the estimated channel value of the resource occupied by the adjacent non-target user; and calculating estimated channel values of resources occupied by other users adjacent to the non-target user by using the estimated channel value of the non-target user in a resource block occupied by the non-target user, and determining the reconstructed estimated channel value of the non-target user by using the estimated channel value of the non-target user and the estimated channel values of the resources occupied by the other users.

In an exemplary embodiment, calculating frequency domain received data of a target user's local pilot frequency at which interference has been cancelled includes:

when a channel of the target user and a channel of the non-target user are orthogonal or weakly correlative, performing a conjugate correlation operation on the frequency domain data of the target user and the reconstructed estimated channel value of the target user to obtain the frequency domain received data of the target user's local pilot frequency at which interference has been cancelled.

In an exemplary embodiment, calculating frequency domain received data of a target user's local pilot frequency at which interference has been cancelled further includes:

when both the target user and the non-target user are comb-division users and there is a strong correlation between the channel of the target user and the channel of the non-target user, cancelling interference data of a comb-division user on an adjacent subcarrier of the target user by using the reconstructed estimated channel values of the comb-division users, to obtain the frequency domain received data of the target user's local pilot frequency at which interference has been cancelled; or when both the target user and the non-target user are code-division users and there is a strong correlation between the channel of the target user and the channel of the non-target user, processing the frequency domain data of the subcarrier occupied by the target user, the frequency domain data of the subcarrier occupied by the adjacent non-target user, and the reconstructed estimated channel value of the target user and the reconstructed estimated channel value of the non-target user by using a minimum mean square error algorithm or a zero forcing algorithm, to obtain frequency domain received data of the subcarrier occupied by the target user and frequency domain received data leaked by the target user on the subcarrier occupied by the adjacent non-target user.

In an exemplary embodiment, calculating frequency domain received data of a target user's local pilot frequency at which interference has been cancelled further includes:

calculating an orthogonalization factor by using the reconstructed estimated channel value of the target user and the reconstructed estimated channel value of the non-target user, and performing an orthogonalization processing on the channel of the non-target user by using the orthogonalization factor such that the channel of the target user is orthogonal to the channel of the non-target user to cancel interference of the frequency domain data of the non-target user to the adjacent subcarrier of the target user during transmission.

In an exemplary embodiment, determining an estimated frequency offset value by using the target user's local pilot frequency at which interference has been cancelled and the frequency domain received data includes:

reconstructing the local pilot frequency of the target user to obtain a reconstructed local pilot frequency sequence;

performing a frequency-time transform on the target user's local pilot frequency at which interference has been cancelled and the frequency domain received data and the reconstructed local pilot frequency sequence respectively, to obtain time domain received data and a time domain data sequence of the local pilot frequency; and measuring a frequency offset by using the obtained time domain received data and time domain data sequence of the local pilot frequency to obtain the estimated frequency offset value.

In an exemplary embodiment, determining an estimated frequency offset value by using the target user's local pilot frequency at which interference has been cancelled and the frequency domain received data further includes:

reconstructing a local mother-code sequence of the target user to obtain a reconstructed local mother-code sequence; and performing a frequency-time transform and cyclic shift operation on the reconstructed local mother-code sequence to obtain the time domain data sequence of the local pilot frequency.

In an exemplary embodiment, measuring a frequency offset by using the obtained time domain received data and time domain data sequence of the local pilot frequency to obtain the estimated frequency offset value further includes:

performing a conjugate correlation operation on the time domain received data and the time domain data sequence of the local pilot frequency to obtain a phase sequence of a time domain, and determining the estimated frequency offset value by using the phase sequence of the time domain.

An apparatus for estimating a frequency offset includes:

a reconstruction module configured to reconstruct an estimated channel value of a target user and an estimated channel value of a non-target user to obtain a reconstructed estimated channel value of the target user and a reconstructed estimated channel value of the non-target user;

an interference cancellation module configured to calculate frequency domain received data of a target user's local pilot frequency at which interference has been cancelled using frequency domain data of a subcarrier occupied by the target user, frequency domain data of a subcarrier occupied by an adjacent non-target user, and the reconstructed estimated channel value of the target user and the reconstructed estimated channel value of the non-target user; and a frequency offset estimation module configured to determine an estimated frequency offset value by using the target user's local pilot frequency at which interference has been cancelled and the frequency domain received data.

In an exemplary embodiment, the reconstruction module includes:

a first reconstruction submodule configured to calculate an estimated channel value of a resource occupied by the adjacent non-target user by using the estimated channel value of the target user in a resource block occupied by the target user, and determine the reconstructed estimated channel value of the target user by using the estimated channel value of the target user and the estimated channel value of the resource occupied by the adjacent non-target user; and a second reconstruction submodule configured to calculate estimated channel values of resources occupied by other users adjacent to the non-target user by using the estimated channel value of the non-target user in a resource block occupied by the non-target user, and determine the reconstructed estimated channel value of the non-target user by using the estimated channel value of the non-target user and the estimated channel values of the resources occupied by the other users.

In an exemplary embodiment, the interference cancellation module calculating the frequency domain received data of the target user's local pilot frequency at which interference has been cancelled includes: when a channel of the target user and a channel of the non-target user are orthogonal or weakly correlative, performing a conjugate correlation operation on the frequency domain data of the target user and the reconstructed estimated channel value of the target user to obtain the frequency domain received data of the target user's local pilot frequency at which interference has been cancelled.

In an exemplary embodiment, the interference cancellation module calculating the frequency domain received data of the target user's local pilot frequency at which interference has been cancelled further includes: when both the target user and the non-target user are comb-division users and there is a strong correlation between the channel of the target user and the channel of the non-target user, cancelling interference data of a comb-division user on an adjacent subcarrier of the target user by using the reconstructed estimated channel value of the comb-division user, to obtain the frequency domain received data of the target user's local pilot frequency at which interference has been cancelled; or when both the target user and the non-target user are code-division users and there is a strong correlation between the channel of the target user and the channel of the non-target user, processing the frequency domain data of the subcarrier occupied by the target user, the frequency domain data of the subcarrier occupied by the adjacent non-target user, and the reconstructed estimated channel value of the target user and the reconstructed estimated channel value of the non-target user by using a minimum mean square error algorithm or a zero forcing algorithm, to obtain frequency domain received data of the subcarrier occupied by the target user and frequency domain received data leaked by the target user on the subcarrier occupied by the adjacent non-target user.

In an exemplary embodiment, the interference cancellation module calculating the frequency domain received data of the target user's local pilot frequency at which interference has been cancelled further includes: calculating an orthogonalization factor by using the reconstructed estimated channel value of the target user and the reconstructed estimated channel value of the non-target user, and performing an orthogonalization processing on the channel of the non-target user by using the orthogonalization factor such that the channel of the target user is orthogonal to the channel of the non-target user to cancel interference of the frequency domain data of the non-target user to the adjacent subcarriers of the target user during transmission.

In an exemplary embodiment, the frequency offset estimation module determining the estimated frequency offset value by using the target user's local pilot frequency at which interference has been cancelled and the frequency domain received data includes: reconstructing the local pilot frequency of the target user to obtain a reconstructed local pilot frequency sequence; performing a frequency-time transform on the target user's local pilot frequency at which interference has been cancelled and the frequency domain received data and the reconstructed local pilot frequency sequence respectively, to obtain time domain received data and a time domain data sequence of the local pilot frequency, and measuring a frequency offset by using the obtained time domain received data and time domain data sequence of the local pilot frequency to obtain the estimated frequency offset value.

In an exemplary embodiment, the frequency offset estimation module determining the estimated frequency offset value by using the target user's local pilot frequency at which interference has been cancelled and the frequency domain received data further includes: reconstructing a local mother-code sequence of the target user to obtain a reconstructed local mother-code sequence, and performing a frequency-time transform and cyclic shift operation on the reconstructed local mother-code sequence to obtain the time domain data sequence of the local pilot frequency.

In an exemplary embodiment, the frequency offset estimation module determining the estimated frequency offset by using the target user's local pilot frequency at which interference has been cancelled and frequency domain received data further includes: performing a conjugate correlation operation on the time domain received data and the time domain data sequence of the local pilot frequency to obtain a phase sequence of a time domain, and determining the estimated frequency offset value by using the phase sequence of the time domain.

A computer readable storage medium has computer executable instructions stored therein, which, when executed by a processor, implement the method for estimating a frequency offset described above.

In the scheme of embodiments of the present disclosure, frequency offset is measured by using discontinuously distributed pilot symbols, such as comb-distributed pilot symbols or the like, and the frequency offset is measured by using effectively the frequency domain data leaked on the adjacent subcarriers during the measurement, to ensure well the frequency offset estimation performance under the circumstance that the pilot symbols are distributed discontinuously. Moreover, the precision of the frequency offset measurement of the target user is improved by cancelling or reducing interference between users.

DETAILED DESCRIPTION

Embodiments of the present disclosure will be described in detail below in conjunction with the accompanying drawings. It should be noted that the embodiments in the present disclosure and features in the embodiments can be combined with each other arbitrarily without conflict.

Figure 1:
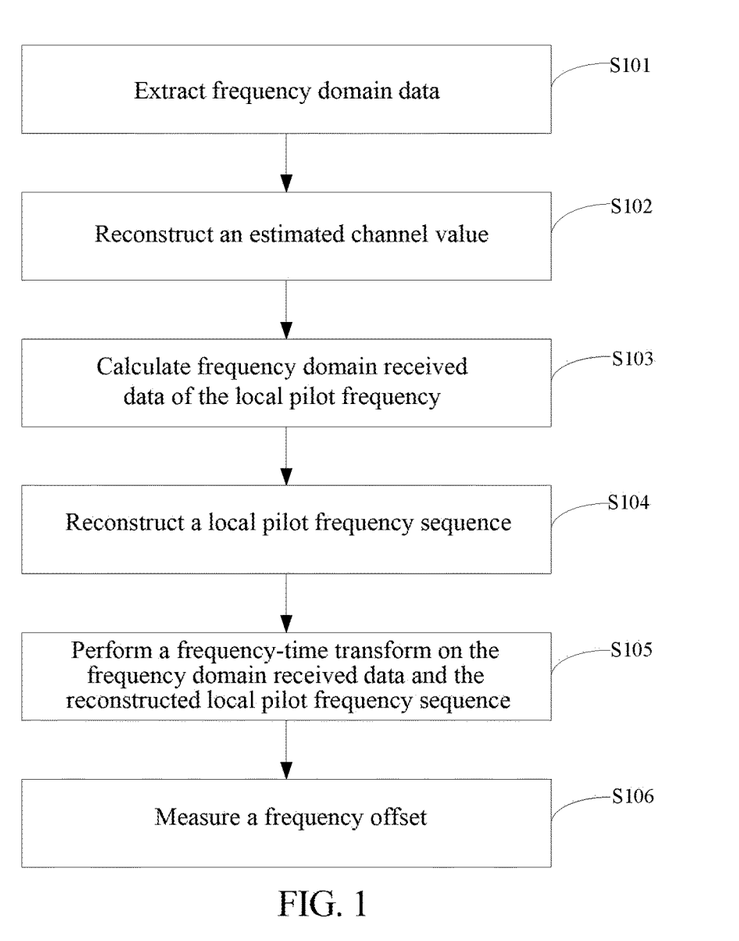
FIG. 1 is a principle block diagram of a method for estimating a frequency offset in accordance with an embodiment of the present disclosure.

FIG. 1 is a principle block diagram of a method for estimating a frequency offset in accordance with an embodiment of the present disclosure. An embodiment of the present disclosure is mainly directed to estimate a frequency offset by using single-symbol pilot frequency under the circumstance of discontinuous distribution, such as comb distribution. The method is not only applied to downlink frequency offset measurement, but also uplink frequency offset measurement. In the embodiment of the present disclosure, during the frequency offset estimation, the frequency offset is estimated by using not only frequency offset information on a target subcarrier but also frequency offset information leaked on adjacent subcarriers, to improve greatly the precision of the frequency offset estimation of a single symbol under the circumstance of comb distribution or discontinuous distribution. As shown in FIG. 1, content of the embodiment includes steps S101-S105.

In step S101, pilot frequency domain data (hereinafter referred to as frequency domain data) of a target user is extracted. The extracted frequency domain data of the target user is represented by Y.

In the process of extracting the frequency domain data of the target user, frequency domain data of a non-target user on adjacent subcarriers are required to be extracted as well at the same time.

During the extraction, if an interval between two subcarriers of the target user is relatively large, only data of L subcarriers of non-target user adjacent to the subcarrier of the target user can be extracted, and the embodiment of the present disclosure is not limited thereto. Considering implementation complexity, the maximum value of L is 3.

In step S102, an estimated channel value is reconstructed. The reconstructed estimated channel value is represented by H.

An estimated channel value of a subcarrier occupied by the target user (i.e., a target subcarrier) is obtained in conjunction with the proven least square (LS) algorithm or the zero forcing (ZF) algorithm in the industry by using discontinuously distributed pilot symbols, such as comb-distributed pilot symbols.

During the frequency offset estimation, not only the data of the subcarriers of the non-target user adjacent to the target subcarrier is required to be used, but also corresponding estimated channel values are required to be obtained at the same time.

Figure 5:
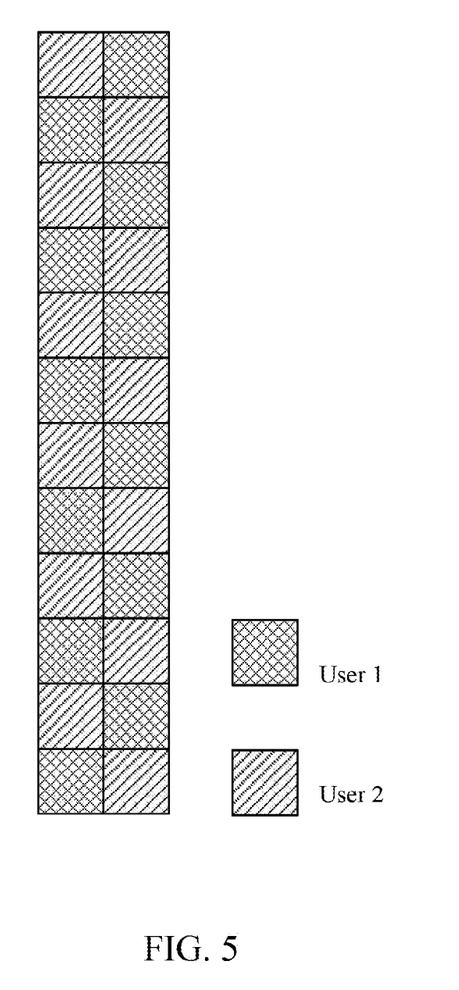
FIG. 5 is a first resource mapping diagram of a comb-division user in accordance with an embodiment of the present disclosure.
Figure 6:
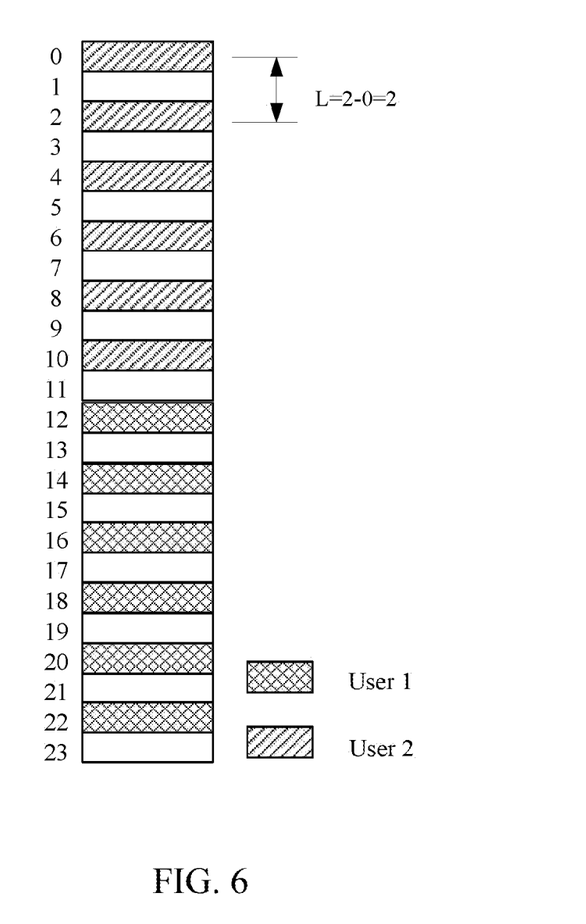
FIG. 6 is a second resource mapping diagram of a frequency-division user in accordance with an embodiment of the present disclosure.

Considering that changes of channel frequency selection characteristics are relatively continuous or slow, thus, an estimated channel value on an adjacent non-target user resource can be obtained by flat-pushing the estimated channel value of the target subcarrier of the target user in practical implementation. For example, through flat-pushing, the estimated channel value on the adjacent non-target user resource is determined to be the estimated channel value of the target subcarrier of the target user. Or the estimated channel value on the non-target user resource can be obtained by using a manner of interpolation between two subcarriers of the target user. For example, through interpolation, the estimated channel value on the adjacent non-target user resource is determined to be an arbitrary value between two estimated channel values corresponding to two subcarriers occupied by the target user. In this point, the embodiment of the present disclosure does not limit the manner in which the estimated channel value on the non-target user resource data is obtained. Preferably, when an interval between two subcarriers is one subcarrier as shown in FIG. 5, thus, for example, for a resource distribution manner for sounding reference signal (SRS), the estimated channel value on the adjacent non-target user resource can be obtained in the flat-pushing manner. When 2 subcarriers have the interval as shown in FIG. 6, the corresponding estimated channel value can be obtained in the flat-pushing manner through the data on the adjacent subcarriers of the target user. When the interval is more than 2 subcarriers, the estimated channel value on the non-target user data bit can be obtained in the interpolation manner through data on two subcarriers of the target user.

It should be noted that if there are code-division users on the data or there are data of other users on adjacent frequency domain data during practical application, to avoid interference between the users, the code-division users at least require to ensure that pilot frequencies between the users are orthogonal to ensure that the accurate estimated channel value can be obtained.

In step S103, the correlation operation between two pieces of data is performed to calculate the received local pilot data (i.e., the frequency domain received data of the local pilot frequency) by using the frequency domain data and the estimated channel value of the target user obtained in step S101 and S102.

It should be noted that if there is no code-division user on the resource occupied by the target user or the adjacent subcarriers are not allocated to other users or other channel data is not transmitted, the manner in which the frequency domain received data of the local pilot frequency of the target user is obtained is relatively simple in such case, i.e., the correlation operation is performed by using directly the frequency domain data obtained in step S101 and the estimated channel value reconstructed in step S102. If there are other users, such as code-division users, on the resource occupied by the target user, not only orthogonality of pilot codes between the code-division users is required to be ensured, but also weak correlation of channels between the code-division users is required to be ensured. If there are other comb-division users on the resource block occupied by the target user, likewise, both pilot orthogonality between the comb-division users and weak correlation of channels between the comb-division users are required to be ensured. Herein, the comb-division users refer to users whose pilot symbols satisfy comb distribution, and the comb distributed pilot symbols are mapped at an equal interval in the frequency domain direction, but not mapped discontinuously, as shown in FIG. 5. To facilitate description of the idea of the embodiment of the present disclosure, this step is processed mainly in the following four cases.

In the first case, there is no other code-division user and comb-division user on the resource block occupied by the target user.

In such case, the following processing is relatively simple, and interference cancellation between the users is not required to be considered. Assuming the estimated channel value reconstructed in step S102 is H and the extracted frequency domain data of the target user is Y, the frequency domain data Y of the target user includes data of L subcarriers of non-target user adjacent to each subcarrier, and the data contains inter carrier interference (ICI) energy and noise interference energy leaked on the subcarrier occupied by the user. That is, since the pilot symbols of the user are distributed discontinuously in the frequency domain, and the resource occupied by the non-target user is spaced therein, the resource occupied by the non-target user is L. A conjugate correlation operation is performed on the reconstructed estimated channel value H and the extracted frequency domain data Y to obtain the frequency domain received data of the local pilot frequency, i.e., $\tilde{X}=Y \times H^*$.

In the second case, there are only comb-division users, but code-division users are not scheduled, on the resource block occupied by the target user.

In such case, interference cancellation between the users is required to be considered. If orthogonality or weak correlation between channels of the comb-division users is satisfied, then the processing is relatively simple, that is, a conjugate correlation is performed by using directly the extracted frequency domain data of the target user and the reconstructed estimated channel value of the target user. Since the channels of two users are orthogonal or weakly correlated, interference of the comb-division users to the target user can be reduced or cancelled. If orthogonality or weak correlation between the channels of the comb-division users cannot be ensured, then the interference cancellation is performed by using orthogonality of the pilot codes of two users. For example, assuming that the frequency domain data on the adjacent subcarriers of the target user is represented as $Y_1=\alpha H_1 X_1+\beta H_2 X_2$. Herein, $X_1$ represents the frequency domain data of the local pilot frequency of the target user; $X_2$ represents the frequency domain data of the local pilot frequency of the comb-division user; $\alpha$ and $\beta$ represent power attenuation factors due to channel or sample offset; and $Y_1$ represents frequency domain data on a certain adjacent subcarrier of the target user, and this subcarrier is a resource occupied by the comb-division user. Therefore, in view of this case, the estimated channel value $\hat{H}_2$ of the comb-division user is obtained firstly, and the manner of calculating channel estimation may be a time domain manner or a frequency domain manner, which will not be described in detail herein. Because local pilot frequency sequences between two users are orthogonal, interference of another user to the target user can be cancelled during the channel estimation. Take the formula provided in the process described above as an example, the interference of this user to the target user is cancelled by using the calculated channel estimation of the comb-division user, i.e., interference cancellation is performed on the data on the adjacent subcarrier of the target user, $\hat{Y}_1=Y_1-\hat{H}_2 X_2$. Interference data on the adjacent subcarrier of the target user is cancelled by using such operation to obtain the frequency domain data $\hat{Y}_1$ after the interference is cancelled, i.e., the leaked energy on the adjacent subcarrier of the target user. The difference between the embodiment of the present disclosure and the traditional comb-division frequency offset calculation manner is that frequency offset is estimated by using the data leaked on the subcarrier of the non-target user during the estimation, i.e., the frequency domain data of the adjacent non-target user participates in the process of estimating the frequency offset of the target user. In this step, the conjugate correlation operation is performed by using the frequency domain data after the interference is cancelled and the estimated channel value to obtain the frequency domain received data of the local pilot frequency. In addition, for this case, interference cancellation manner, such as the minimum mean square error (MMSE) algorithm or the zero forcing algorithm or the like may be used, and meanwhile, the frequency domain data of the target user on this subcarrier and the frequency domain data leaked on the adjacent subcarrier are obtained. The interference of the comb-division user to the target user can be cancelled effectively through this manner, but the implementation complexity is relatively large, so this manner will not be used as a preferable scheme in this configuration.

In addition, in the case that the channels between two users does not satisfy orthogonality or weak correlation, the idea of Gram-Schmidt orthogonalization can also be used for orthogonalizing the channels of the two users, and the orthogonalization processing is performed on the channel of the transmitting end user. This idea is mainly used for a time division duplex (TDD) mode. Considering mainly that uplink and downlink channels are symmetrical in the TDD mode, an orthogonalization vector, i.e., orthogonalization factor w of the channels of the two users is calculated by using channel information obtained on the uplink. The estimated channel values of the target user and the comb user are defined as $H_1$ and $H_2$ respectively in the channel model constructed previously, then w=$(H_2^H H_2)^{-1} H_2^H \hat{H}_2$. Herein, $$\hat{H}_2 = H_2 - \left(\frac{H_1}{\|H_1\|}\right)^H H_2 \left(\frac{H_1}{\|H_1\|}\right).$$

Then the orthogonalization processing is performed on the channel of the comb user by using the orthogonalization factor w, i.e., an orthogonalization pre-processing is performed on the channel of the user at the transmitting end by using the factor, i.e., a premultiplication is performed on the factor w by the frequency domain data at the transmitting end.

In the third case, comb-division users are not scheduled, but there are code-division users, on the resource block occupied by the target user.

For processing in such case, if the channels between the code-division users are orthogonal or correlated weakly, the processing in such case is relatively simple. The conjugate correlation operation is performed by using directly the frequency domain data of the target user in step S101 and the estimated channel value of the target user in step S102. Because the channels are orthogonal or correlated weakly, this operation can reduce or cancel interference of the code-division users to the target user. If the channels of code-division users do not satisfy orthogonality or weak correlation, in such case, the manner described above will have influence on the finally estimated performance. For such case, two kinds of ideas can be used to solve the problem. One idea is to ignore the influence of the interference between the users, and perform frequency offset estimation by using directly the frequency domain data in previous step S101 and the estimated channel value in step S102. An advantage of this idea is that the processing is relatively simple, and a disadvantage is that there is the interference of the code-division users to the target user, which influences the final measurement precision. The other idea is to consider interference cancellation between the code-division users, and the cancellation manner may use MMSE or ZF or the like, and the interference cancellation is performed by using the frequency domain data extracted in step S101 and the channel estimation result in step S102, as described previously, to obtain corresponding data. Assuming that in a configuration that there are two code-division users, received data on a subcarrier occupied by the target user is represented as $$Y_k = \sum_{k=n}^{n+M} \alpha_k X_k^1 H_k^1 + \beta_k X_k^2 H_k^2,$$

and received data on the resource occupied by the adjacent non-target user is represented as $$Y_l = \sum_{l=m}^{m+M} \alpha_l X_l^1 H_l^1 + \beta_l X_l^2 H_l^2,$$

at which point, frequency domain data on the corresponding subcarrier on the resource occupied by the target user and data energy of the target user leaked on the subcarrier of the adjacent non-target user can be calculated by using the interference cancellation manner. For example, $\beta_k X_k^2$, $\alpha_k X_k^1$, $\beta_k X_k^2$ and $\beta_1 X_1^2$ are calculated respectively by using the ZF. Since for each of the users energy leakage of multiple adjacent subcarriers is contained, and the size of the leaked energy is related to the interval of the subcarriers and sample offset, in the usual case, only M adjacent subcarriers are considered for the interference cancellation. In addition, another solution proposed in the embodiment of the present disclosure is to perform an orthogonalization processing on the channels of two code-division users. The processing manner is similar to the second case and will not be repeated herein.

For the code-division users, the interference between the users can be reduced from a scheduling view, thereby decreasing processing complexity for lower layers, i.e., during scheduling it is required to ensure that frequency offsets of two code-division users are in the same direction or the difference between the frequency offsets of the two users is small. During calculation, since pilot data between the code-division users have a fixed phase offset, the phase offset is transferred to an estimated channel value for calculating the received frequency domain data of the local pilot frequency of the target user, i.e., $\hat{X}=((H^1+H^2 e^{j\pi\alpha})^H (H^1+H^2 e^{j\pi\alpha}))^{-1}(H^1+H^2 e^{j\pi\alpha})^H Y$. This calculation manner does not need to pay close attention to orthogonality of the channels of two users, and it is only required to ensure that the difference between the frequency offsets of the two code-division users is small. Herein, $\alpha$ is a cyclic shift factor of the code-division user relative to the target user.

In the fourth case, there are not only a comb-division user but also a code-division user on the resource block occupied by the target user.

For this case, if the channels between the target user and the comb-division users and code-division users are orthogonal or correlated weakly, the processing in such case is relatively simple, and the conjugate correlation operation is performed by using directly the frequency domain data of the target user (including frequency domain data on an adjacent resource) in previous step S101 and the estimated channel value of the target user in step S102. Because the channels of two users are orthogonal or correlated weakly, interference of the code-division user or comb-division user can be cancelled under the operation described above. If the channels between the target user and the comb-division user or code-division user are orthogonal or correlated weakly, but the channels between the target user and the other user is correlated strongly, the processing manner in such case refers to that in the second case or the third case. If the channels between the target user and both the comb-division and code-division users are correlated strongly, in such case, there kinds of ideas can be used to solve the problem. One idea is to ignore interference between the target user and the comb-division user or code-division user, and perform a conjugate correlation operation by using directly the frequency domain data on the resource occupied by the target user and the corresponding estimated channel value. It should be noted that the used frequency domain data is different from that used in the manner of extracting the frequency domain data described previously, and only the frequency domain data on the resource occupied by the target user is extracted regardless of the leaked data energy. The measurement precision of this manner is low and will be influenced by the interference of the code-division user and comb-division user, and the estimation precision will be influenced by the interference between the users. The second idea is to, regardless of the influence of the comb-division users to the target user, in the implementation process, cancel the data of the comb-division user on the adjacent subcarrier of the target user by using the calculated estimated channel value of the comb-division user and the local pilot data to obtain the data energy which is leaked by the target user and the code-division user on subcarriers, adjacent to the target user and the code-division user, of the comb-division user. The specific processing manner for the code-division user may refer to the processing manner for the third case and will not be repeated herein. The third idea is to consider interference cancellation of the code-division user and comb-division user. For this case, the Gram-Schimdt orthogonalization manner may be used firstly such that the channels of the code-division user and the comb-division user are orthogonal to the channel of the target user, and then the frequency domain received data of the local pilot frequency of the target user is obtained according to a conventional idea.

In step S104, a local pilot frequency sequence of the target user is reconstructed.

It should be noted that the processing can be performed by using two kinds of ideas. One idea is to reconstruct the local pilot frequency sequence of the target user directly, and the other idea is to reconstruct a mother-code sequence corresponding to the target user.

This process is relatively simple, and the length of the reconstructed local pilot frequency sequence or local mother-code sequence is the same as the length of the previously reconstructed frequency domain data. Herein, a pilot frequency sequence or mother-code sequence corresponding to the subcarrier occupied by the non-target user is 0.

In step S105, a frequency-time transform is performed on the previously calculated frequency domain received data of the local pilot frequency and the reconstructed local pilot frequency sequence/local mother-code sequence.

Inverse discrete Fourier transform (IDFT) or inverse fast Fourier transform (IFFT) or other frequency-time transform may be used during the transformation, and the present disclosure is not limited thereto.

It should be noted that if the local mother-code sequence is used in step S104, then upon transform to the time domain, a time domain sequence corresponding to the pilot frequency of the user is recovered according to cyclic shift corresponding to the user.

In step S106, frequency offset is measured by using the time domain sequence corresponding to the previously calculated local pilot frequency sequence/local mother-code sequence and the time domain sequence corresponding to the frequency domain received data.

In this step, the calculation is completed by using mainly a feature that frequency offset will cause a linear phase in the time domain, in the process of implementation, a phase difference between every two points or a phase difference between the first half and the second half can be used, or a phase sequence can be divided into several segments and then a phase difference between every two segments is calculated. Finally, a final estimated frequency offset value is obtained based on the phase difference described above. Since this process does not belong to main thought points of the present disclosure, it will not be described in detail herein.

The embodiments of the present disclosure will be described by taking SRS as an example in the following two embodiments.

First Embodiment

In this embodiment, there are only frequency-division users and no comb-division user and code-division user. Since resource distribution of the SRS is comb distribution, and as shown in FIG. 6, an interval L between two subcarriers of the frequency-division users is 2. In the following process, the distributed resources of the SRS are 24 RB, herein the effective resources are 12 RB. The implementation process is described as below and includes steps 1 to step 6.

In step 1, the frequency domain data of the target user is extracted.

It should be noted that if the received data is time domain data, the pilot frequency domain needs to be transformed firstly. A time-frequency transform is the common processing in long term evolution (LTE), and will not be described in detail herein. In the process of extracting the frequency domain data of the target user, not only the data of the subcarrier occupied by the target user needs to be extracted, but also the frequency domain data on the adjacent subcarrier (data of a subcarrier occupied by the non-target user) needs to be extracted. The extracted frequency domain data is represented by $Y_k$, herein k is an index of a subcarrier, k=0, 1, L, 287.

In step 2, the estimated channel value of the target user is reconstructed.

If the estimated channel value of the target user is not obtained, then the estimated channel value of the target user needs to be calculated firstly. Herein, a time domain manner may be used for the calculation, or a frequency domain manner may also be used for the calculation. As to what manner is used, the present disclosure has no limitation. If the estimated channel value of the target user is obtained, then the estimated channel value needs to be reconstructed by using the estimated channel value of the target user. The main idea for reconstruction is to, in the resource block occupied by the target user, obtain the estimated channel value on the resource occupied by the non-target user by flat-pushing the estimated channel value corresponding to the subcarrier of the adjacent target user. Considering that channel frequency selection transform will not be too fast, the flat-pushing manner is suggested to be used, but the present disclosure is not limited thereto, linear interpolation or not-linear interpolation may be used to obtain the estimated channel value on the resource occupied by the non-target user. In this embodiment, the estimated channel value on the resource occupied by the non-target user is reconstructed in the flat-pushing manner. Assuming that the estimated channel value of the target user is $H_k$, herein k=0, 1, L,143, then the reconstructed estimated channel value is represented as $\tilde{H}_k$. If the pilot symbols of the target user are distributed in a comb manner, an estimated channel value on its corresponding position of the frequency domain resource is the estimated channel value $H_k$ on the target subcarrier of the target user, and an estimated channel value which is on the resource adjacent to each subcarrier and is not been allocated to the target user is the estimated channel value on the resource data of the not-target user. The reconstructed estimated channel value $\tilde{H}_k$ consists of the former two, i.e., $\tilde{H}_k$ contains $H_k$.

In step 3, the frequency domain received data of the local pilot frequency is calculated.

For the calculation in this process, conjugate multiplication is performed by using directly the previously extracted frequency data and the reconstructed estimated channel value of the target user, to cancel the influence of the channel on the received data, i.e., the calculated frequency domain received data of the local pilot frequency, which is represented as $\tilde{X}=Y_k \times \tilde{H}^*_k$, k=0, 1, L, 287.

It should be noted that in the case of discontinuous distribution of the pilot symbols, the resource block occupied by the target user includes not only the resource of the target user but also an idle resource or even resources of other users. Therefore, the number of the reconstructed estimated channel values of the target user is greater than the number of subcarriers occupied actually by the target user.

In step 4, a local pilot frequency sequence of the target user is reconstructed.

It should be noted that the processing can be completed by using two kinds of ideas. One idea is to reconstruct the pilot frequency sequence of the target user directly, and the other idea is to reconstruct a mother-code sequence corresponding to the target user. This process is relatively simple, and the length of the reconstructed local pilot frequency sequence or local mother-code sequence is the same as the length of the previously reconstructed frequency domain data. Herein, a pilot frequency sequence or mother-code sequence value corresponding to the subcarrier occupied by the non-target user is 0. In this embodiment, taking reconstruction of the local frequency sequence of the target user as an example, the local frequency sequence is represented by $X_k$, herein k=0, 1, L, 143, the reconstructed local frequency sequence is represented as $$\hat{X}_k, \text{ i.e., } \begin{cases} \hat{X}_{2k} = X_k \\ \hat{X}_{2k+1} = 0 \end{cases}, \text{ herein } k = 0, 1, L, 143.$$

In step 5, a frequency-time transform is performed on the previously calculated frequency domain received data of the local pilot frequency and the reconstructed local pilot frequency sequence.

IDFT or IFFT or other frequency-time transform may be used during the transformation. In this embodiment, frequency-time transform is performed in the IFFT manner. Since the length of the previously reconstructed data is 288, but the length of the IFFT is $2^n$, firstly zero insertion processing is performed on the tail of the previous local pilot frequency sequence and the tail of the calculated frequency domain received data of the local pilot to satisfy the length of $2^n$, i.e., 224 zeros are firstly inserted into two pieces of frequency domain data, then the IFFT is performed on the frequency domain data into which the zeros are inserted, to obtain a time domain sequence $Tx_n$ corresponding to the local pilot frequency sequence (i.e., a time domain data sequence of the local pilot frequency) and time domain data $Rx_n$ corresponding to the frequency domain received data of the local frequency (i.e., time domain received data of the local pilot frequency), herein n=0, 1, L, 511.

In step 6, frequency offset is measured by using the previously calculated time domain data sequence $Tx_n$ and the time domain received data $Rx_n$ of the local pilot frequency.

In this step, the calculation is completed by using mainly a feature that frequency offset will cause a linear phase in the time domain, and in the process of implementation, a phase difference between every two points or a phase difference between the first half and the second half can be used, or a phase sequence can be divided into several segments and then a phase difference between every two segments is calculated. Finally, a final estimated frequency offset value is obtained based on the phase difference described above. This process is as follows and includes sub-step 1 and sub-step 2.

In sub-step 1, conjugate correlation operation is performed by using the previously calculated time domain data sequence $Tx_n$ of the local pilot frequency and the time domain received data $Rx_n$ of the local pilot frequency, to obtain a phase sequence WR caused by frequency offset, i.e., $WR_n = Tx_n \times (Rx_n)^* n=0, 1, L, 511$.

In sub-step 2, the frequency offset is estimated by using the fact that the phase caused by the frequency offset is in a linear relationship in the time domain. During the estimation, the frequency offset may be estimated by using sampling points which are adjacent to each other or using a uniformly-spaced manner or a non-uniformly-spaced manner. Embodiments of the present disclosure are not limited for the manner which will be used. In addition, when the frequency offset is calculated, truncation operation can be performed on the phase sequence, i.e., part of the phase sequence can be used for estimating the frequency offset, the present disclosure is not limited thereto. In the following description, all of the phase sequence will be used for estimating the frequency offset. In the following embodiment, the phase difference between the first half and the second half is used for estimating the frequency offset, i.e., $\Delta \Delta f = \dfrac{\Delta \phi \times \Delta f}{\pi}$, herein Δf is the size of the interval between the subcarriers;

$$\Delta\phi = \text{angle}\left(\frac{\sum_{k=0}^{L^1/2-1} WR(k+L^1/2)}{\sum_{k=0}^{L^1/2-1} WR(k)}\right) \bigg| 0 \leq k \leq L^1/2; L^1 = 512.$$

Second Embodiment

In this embodiment, there are code-division users and no frequency-division user. In this embodiment, frequency offset values between the target user and the code-division users are ensured to be the same through a scheduling manner, and it is assumed that a cyclic shift difference of the pilot frequency sequence between two users is π. The implementation process is described as below and includes steps 1 to 6.

In step 1, the frequency domain data of the target user is extracted.

It should be noted that if the received data is time domain data, the pilot frequency domain needs to be transformed firstly. A time-frequency domain transform is a common processing in LTE and will not be described in detail herein. In the process of extracting the frequency domain data of the target user, not only the data of the subcarrier occupied by the target user needs to be extracted, but also the frequency domain data on the adjacent subcarrier (subcarrier data occupied by the non-target user) needs to be extracted. The extracted frequency domain data is represented by $Y_k$, herein k=0, 1, L, 287.

In step 2, the estimated channel value of the target user is reconstructed.

If the estimated channel value of the target user is not obtained, then the estimated channel value of the target user needs to be calculated firstly, herein a time domain manner may be used for the calculation, or a frequency domain manner may also be used for the calculation. As to what manner is used, the present disclosure has no limitation. If the estimated channel value of the target user is obtained, then the estimated channel value needs to be reconstructed by using the estimated channel value of the target user. The main idea for reconstruction is to, in the resource block occupied by the target user, obtain the estimated channel value on the resource occupied by the non-target user by flat-pushing the estimated channel value corresponding to the subcarrier of the adjacent target user. Considering that channel frequency selection transform will not be too fast, the flat-pushing manner is suggested to be used, but the present disclosure is not limited thereto. A linear interpolation or not-linear interpolation may be used to obtain the estimated channel value on the resource occupied by the non-target use. In this embodiment, the estimated channel value on the resource occupied by the non-target user is reconstructed in the flat-pushing manner. Assuming that the estimated channel value of the target user is $H_k^1$, herein k=0, 1, L, 143, then the reconstructed estimated channel value is represented as $\tilde{H}_k$.

Likewise, the estimated channel value of the code-division user needs to be obtained by using the time domain manner or the frequency domain manner, which is same as that for the target user, and the present disclosure is not limited on the manner. Assuming that the estimated channel value of the code-division user is $H_k^2$, herein k=0, 1, L, 143, then the reconstructed estimated channel value is represented as $\tilde{H}_k$.

In step 3, the frequency domain data received by the local frequency (i.e., the frequency domain received data of the local pilot frequency) is calculated.

For the calculation in this process, interference cancellation between the coed-division users needs to be considered, i.e., the calculated frequency domain received data of the local pilot frequency is represented as $\tilde{X} = ((H_k^1 + H_k^w e^{j\pi x})^H (H_k^1 + H_k^2 e^{j\pi x}))^{-1} (H_k^1 + H_k^3 e^{j\pi x})^H Y_k$, k=0, 1, L, 287. Herein, α is cyclic shift of $H_k^2$ relative to $H_k^1$, that is, pilot frequency cyclic shift of user 2 relative to user 1.

In step 4, a local pilot frequency sequence of the target user is reconstructed.

It should be noted that the processing can be completed by using two kinds of ideas. One idea is to reconstruct the pilot frequency sequence of the target user directly, and the other idea is to reconstruct a mother-code sequence corresponding to the target user. This process is relatively simple, and the length of the reconstructed local pilot frequency sequence or mother-code sequence is the same as the length of the previously reconstructed frequency domain data. Herein, a pilot frequency sequence or mother-code sequence value corresponding to the subcarrier occupied by the non-target user is 0. In this embodiment, taking reconstruction of the local frequency sequence of the target user as an example, the local frequency sequence is represented by $X_k$, herein k=0, 1, L, 143, the reconstructed local frequency sequence is represented as $$\hat{X}_k, \text{ i.e., } \begin{cases} \hat{X}_{2k} = X_k \\ \hat{X}_{2k+1} = 0 \end{cases}, \text{ herein } k = 0, 1, L, 143.$$

In step 5, a frequency-time transform is performed on the previously calculated frequency domain received data of the local pilot frequency and the reconstructed local pilot frequency sequence.

IDFT or IFFT or other frequency-time transform may be used during the transformation. In this embodiment, the frequency-time transform is performed in the IFFT manner. Since the length of the previously reconstructed data is 288, but the length of the IFFT is $2^n$, firstly a zero insertion processing is processed on the tail of the frequency domain data of the local pilot frequency (i.e., the local pilot frequency sequence) and the tail of the calculated frequency domain received data of the local pilot to satisfy the length of $2^n$, i.e., 224 zeros are firstly inserted into two pieces of frequency domain data, then the IFFT is performed on the frequency domain data into which the zeros are inserted, to obtain a time domain sequence $Tx_n$ of the local pilot frequency and time domain data $Rx_n$ of the local pilot frequency, herein n=0, 1, L, 511.

In step 6, frequency offset is measured by using the previously calculated time domain data sequence $Tx_n$ and the time domain received data $Rx_n$ of the local pilot frequency.

In this step, the calculation is completed by using mainly a feature that frequency offset will cause a linear phase in the time domain, and in the process of implementation, a phase difference between every two points or a phase difference between the first half and the second half may be used, or a phase sequence can be divided into several segments and then a phase difference between every two segments is calculated. Finally, a final estimated frequency offset value is obtained based on the phase difference described above. This process is as follows and includes sub-step 1 and sub-step 2.

In sub-step 1, conjugate correlation operation is performed by using the previously calculated time domain data sequence $Tx_n$ of the local pilot frequency and the time domain received data $Rx_n$ of the local pilot frequency, to obtain a phase sequence WR caused by frequency offset, i.e., $WR_n = Tx_n \times (Rx_n)^* n=0, 1, L, 511$.

In sub-step 2, the frequency offset is estimated by using the fact that the phase caused by the frequency offset is in a linear relationship in the time domain. During the estimation, the frequency offset may be estimated by using sampling points which are adjacent to each other or using a uniformly-spaced manner or a non-uniformly-spaced manner. Embodiments of the present disclosure are not limited for the manner. In addition, when the frequency offset is calculated, intercepting operation may be performed on the phase sequence, i.e., part of the phase sequence may be used for estimating the frequency offset, and the present disclosure is not limited thereto. In the following description, all of the phase sequence will be used for estimating the frequency offset. In the following embodiment, the phase difference between the first half and the second half is used for estimating the frequency offset, $$\text{i.e., } \Delta \Delta f = \frac{\Delta \phi \times \Delta f}{\pi},$$

herein $\Delta f$ is the size of the interval between the subcarriers;

$$\Delta \phi = \text{angle} \left( \frac{\sum_{k=0}^{L^1/2-1} WR(k+L^1/2)}{\sum_{k=0}^{L^1/2-1} WR(k)} \right) 0 \le k \le L^1/2; L^1 = 512.$$

Figure 2:
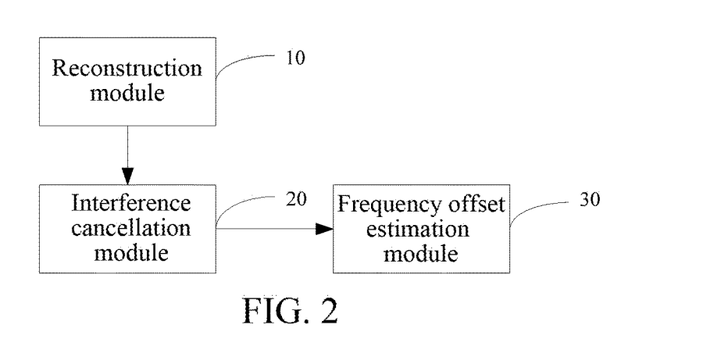
FIG. 2 is a block diagram of an apparatus for estimating a frequency offset in accordance with an embodiment of the present disclosure.

FIG. 2 is a block diagram of an apparatus for estimating a frequency offset in accordance with an embodiment of the present disclosure, which, as shown in FIG. 2, includes a reconstruction module 10, an interference cancellation module 20 and a frequency offset estimation module 30.

The reconstruction module 10 is configured to reconstruct an estimated channel value of a target user and an estimated channel value of a non-target user to obtain a reconstructed estimated channel value of the target user and a reconstructed estimated channel value of the non-target user. The reconstruction module 10 includes a first reconstruction submodule and a second reconstruction submodule. Herein, the first reconstruction submodule is configured to calculate an estimated channel value of a resource occupied by the adjacent non-target user by using the estimated channel value of the target user in a resource block occupied by the target user, and determine the reconstructed estimated channel value of the target user by using the estimated channel value of the target user and the estimated channel value of the resource occupied by the adjacent non-target user. The second reconstruction submodule is configured to calculate estimated channel values of resources occupied by other users adjacent to the non-target user by using the estimated channel value of the non-target user in a resource block occupied by the non-target user, and determine the reconstructed estimated channel value of the non-target user by using the estimated channel value of the non-target user and the estimated channel values of the resources occupied by the other users. The reconstruction processing steps of the first reconstruction submodule and the second reconstruction submodule may refer to step S102 in FIG. 1, i.e., step 2 of the first embodiment and step 2 of the second embodiment, and will not repeated herein.

The interference cancellation module 20 is configured to calculate frequency domain received data of the target user's local pilot frequency at which interference has been cancelled by using frequency domain data of a subcarrier occupied by the target user, frequency domain data of a subcarrier occupied by the adjacent non-target user, and the reconstructed estimated channel value of the target user and the reconstructed estimated channel value of the non-target user.

The interference cancellation may be performed according to the following several manners.

1. If a channel of the target user and a channel of the non-target user are orthogonal or weakly correlated, then the interference cancellation module 20 will perform a conjugate correlation operation on the frequency domain data of the target user and the reconstructed estimated channel value of the target user to obtain the frequency domain received data of the target user's local pilot frequency at which interference has been cancelled.

2. If both the target user and the non-target user are comb-division users and there is a strong correlation between the channel of the target user and the channel of the non-target user, the interference cancellation module 20 will cancel interference data of the comb-division user on adjacent subcarriers of the target user by using the reconstructed estimated channel values of the comb-division users, to obtain the frequency domain received data of the target user's local pilot frequency at which interference has been cancelled.

3. If both the target user and the non-target user are code-division users and there is a strong correlation between the channel of the target user and the channel of the non-target user, then the interference cancellation module 20 will process the frequency domain data of the subcarrier occupied by the target user, the frequency domain data of the subcarrier occupied by the adjacent non-target user, and the reconstructed estimated channel value of the target user and the reconstructed estimated channel value of the non-target user by using a minimum mean square error algorithm or a zero forcing algorithm, to obtain frequency domain received data of the subcarrier occupied by the target user and frequency domain received data leaked by the target user on the subcarrier occupied by the adjacent non-target user.

4. In addition to the cases described above, the interference cancellation module 20 may further calculate an orthogonalization factor by using the reconstructed estimated channel value of the target user and the reconstructed estimated channel value of the non-target user, and perform an orthogonalization processing on the channel of the non-target user by using the orthogonalization factor such that the channel of the target user is orthogonal to the channel of the non-target user to cancel interference of the frequency domain data of the non-target user to the adjacent subcarriers of the target user during transmission. That is to say, the interference cancellation module 20 needs firstly to extract the associated frequency data according to the step S101 in FIG. 1, i.e., the step 1 of the first embodiment and the step 1 of the second embodiment, and then obtain the frequency domain received data of the target user's local pilot frequency at which interference has been cancelled by using the extracted frequency domain data and the reconstructed estimated channel value calculated by the reconstructed module 10 according to the processing of the step S103 of FIG. 1.

The frequency offset estimation module 30 is configured to determine an estimated frequency offset value by using the target user's local pilot frequency at which interference has been cancelled and the frequency domain received data. The frequency offset estimation module 30 reconstructs the local pilot frequency of the target user to obtain a reconstructed local pilot frequency sequence, performs a frequency-time transform on the target user's local pilot frequency at which interference has been cancelled and the frequency domain received data and the reconstructed local pilot frequency sequence respectively, to obtain time domain received data and a time domain data sequence of the local pilot frequency, and then performs a conjugate correlation operation on the time domain received data and the time domain data sequence of the local pilot frequency to obtain a phase sequence of a time domain, and determines the estimated frequency offset value by using the phase sequence of the time domain. Herein, the time domain data sequence of the local frequency may further be obtained by the following manner: reconstructing a local mother-code sequence of the target user to obtain a reconstructed local mother-code sequence, and performing a frequency-time transform and cyclic shift operation on the reconstructed local mother-code sequence to obtain the time domain data sequence of the local pilot frequency. That is, the frequency offset estimation module 30 performs the steps S104 to S106 in turn by using the target user's local pilot frequency at which interference has been cancelled and the frequency domain received data to determine the estimated frequency offset value.

Figure 3:
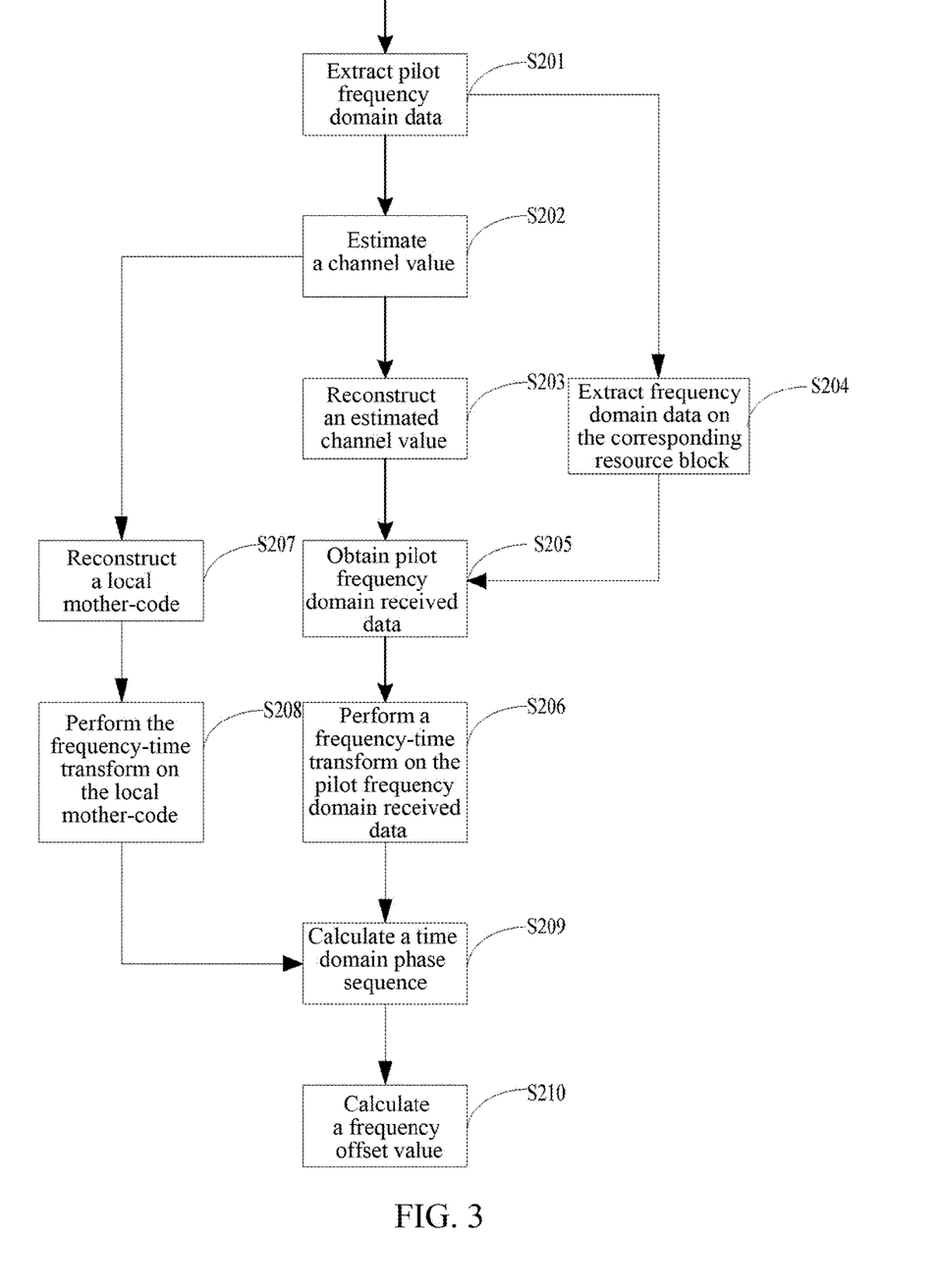
FIG. 3 is a flow chart of a process of frequency offset estimation for a frequency-division user in accordance with an embodiment of the present disclosure.

FIG. 3 is a flow chart of a process of frequency offset estimation for a frequency-division user in accordance with an embodiment of the present disclosure, which, as shown in FIG. 3, includes steps S201-S210.

In step S201, the frequency domain data is extracted.

The extracted frequency domain data includes the frequency domain data of the subcarrier occupied by the target user and the frequency domain data of the subcarrier occupied by the non-target user on the adjacent subcarrier.

In step S202, the channel value is estimated.

If the estimated channel value of the target user is not obtained, then the estimated channel value of the target user needs to be calculated firstly by using pilot symbols, and a time domain manner or a frequency domain manner may be used for the calculation. As to what manner is used, the present disclosure has no limitation.

Likewise, if there are other users, such as code-division users, the channel estimation also needs to be performed to obtain estimated channel values of other users, such as code-division users.

In step S203, the estimated channel value is reconstructed.

The estimated channel value is reconstructed by using the estimated channel value of the target user to obtain the reconstructed estimated channel value of the target user.

Likewise, if there are other users, such as code-division users, the estimated channel also needs to be reconstructed to obtain the reconstructed estimated channel values of other users, such as code-division users.

It should be noted that because of discontinuous distribution of the pilot symbols, the number of the reconstructed estimated channel values is greater than the number of subcarriers occupied actually by the target user.

In step S204, the frequency domain data on the corresponding resource block in the step S201 is extracted for calculation in step S205.

In step S205, pilot frequency domain received data is obtained, i.e., the frequency domain received data of the local pilot frequency is calculated. Referring to step 103 in FIG. 1, four cases may be processed according to different situations.

In step S206, a frequency-time transform of the pilot frequency domain received data is performed, i.e., the frequency domain received data is transformed into the time domain received data.

In step S207, the local mother-code sequence is reconstructed to obtain the reconstructed local mother-code sequence.

In step S208, a frequency-time transform is performed on the reconstructed local mother-code sequence to obtain the corresponding data sequence for calculation in step S209.

In step S209, a phase sequence in the time domain is calculated by using the calculation results in steps S206 and S208.

In step S210, a frequency offset value is calculated by using the phase sequence in the time domain.

Figure 4:
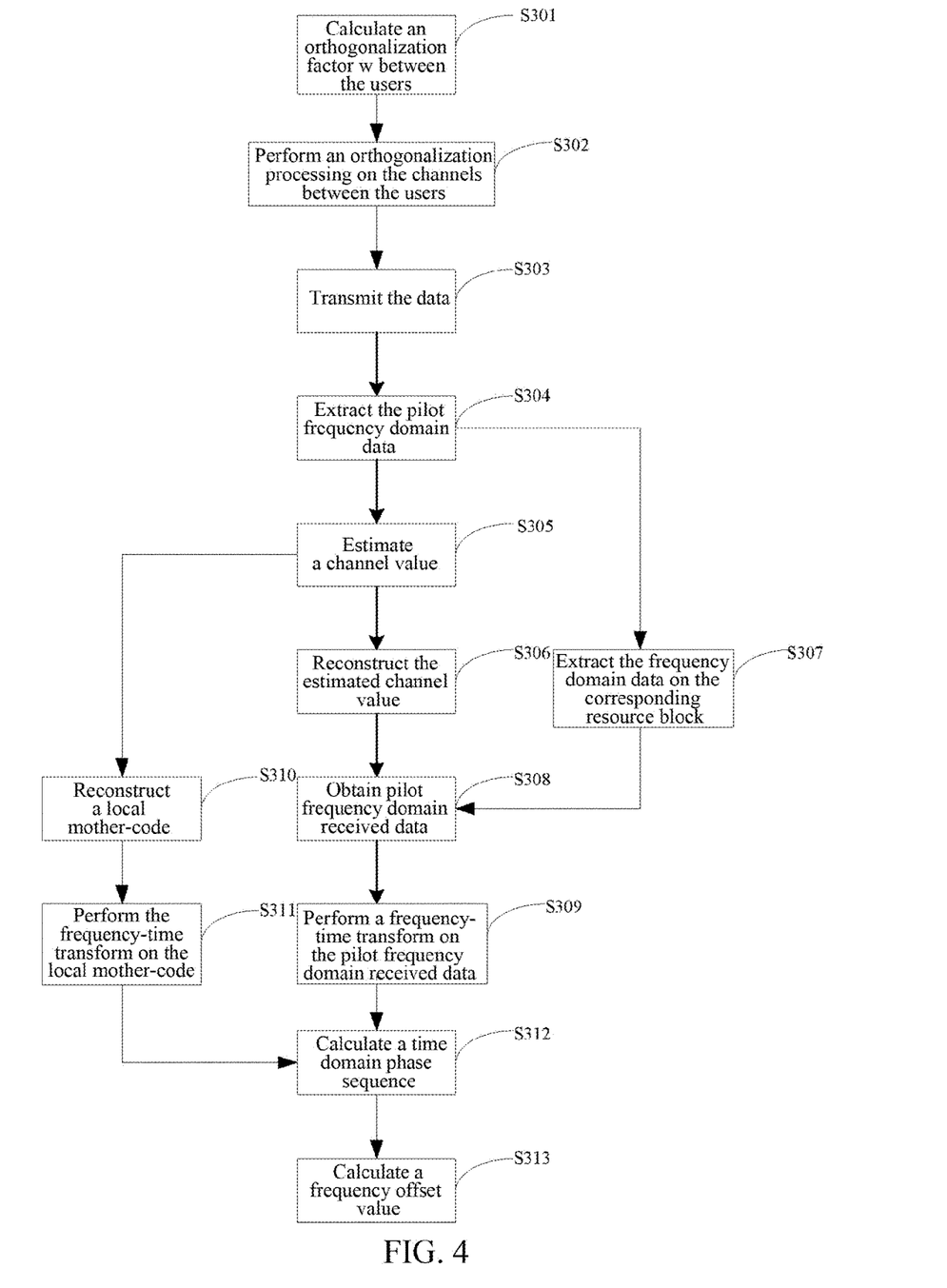
FIG. 4 is a flow chart of a process of frequency offset estimation in which there is a strong correlation between users in accordance with an embodiment of the present disclosure.

FIG. 4 is a flow chart of a process of frequency offset estimation in which there is a strong correlation between users in accordance with an embodiment of the present disclosure, which, as shown in FIG. 4, includes steps S301-S313.

In step S301, in the case that the channels between two users does not satisfy orthogonality or weak correlation (i.e., the two users are correlated strongly), a channel orthogonalization factor between the two users are calculated by using channel information obtained on the uplink.

In step S302, the channels of the users are orthogonalized by using the channel orthogonalization factor, i.e., a pre-multiplication is performed on the orthogonalization factor by the frequency domain data at the transmitting end.

In step S303, the transmitting end transmits the orthogonalized frequency domain data.

In step S304, the frequency domain data is extracted.

The extracted frequency domain data includes the frequency domain data of the subcarrier occupied by the target user and the frequency domain data of the subcarrier occupied by the non-target user on the adjacent subcarrier.

In step S305, the channel value is estimated.

If the estimated channel value of the target user is not obtained, then the estimated channel value of the target user needs to be calculated firstly, and a time domain manner or a frequency domain manner may be used for the calculation. As to what manner is used, the present disclosure has no limitation.

Likewise, if there are other users, such as code-division users, the channel estimation also needs to be performed to obtain estimated channel values of other users, such as code-division users.

In step S306, the estimated channel value is reconstructed.

The estimated channel value is reconstructed by using the estimated channel value of the target user to obtain the reconstructed estimated channel value of the target user.

Likewise, if there are other users, such as code-division users, the estimated channel value also needs to be reconstructed to obtain the reconstructed estimated channel values of other users, such as code-division users.

In step S307, the frequency domain data on the corresponding resource block in the step S304 is extracted for calculation in step S308.

In step S308, pilot frequency domain received data is obtained, i.e., the frequency domain received data of the local pilot frequency is calculated. Referring to step S103 in FIG. 1, four cases may be processed according to different situations.

In step S309, a frequency-time transform of the pilot frequency domain received data is performed, i.e., the frequency domain received data is transformed into the time domain received data.

In step S310, the local mother-code sequence is reconstructed to obtain the reconstructed local mother-code sequence.

In step S311, a frequency-time transform is performed on the reconstructed local mother-code sequence to obtain the corresponding data sequence for calculation in step S312.

In step S312, a phase sequence in the time domain is calculated by using the calculation results in steps S309 and S311.

In step S313, a frequency offset value is calculated by using the phase sequence in the time domain.

The embodiments of the present disclosure provide a method and apparatus for estimating a frequency offset by using a single symbol, applied to OFDM systems, for synchronization issues of the OFDM technology in the wireless communication field.

In the embodiments of the present disclosure, during the frequency offset estimation, interference between the users can be cancelled effectively, thereby ensuring the precision of the frequency offset measurement of the users in the case of discontinuous distribution of resources.

According to the technology scheme disclosed in the embodiments of the present disclosure, any modification, equivalent substitution and improvement and so on made by any engineer having knowledge background of signal processing and communication, who can design the corresponding apparatus according to the present disclosure, are contained in the idea and scope of the present disclosure.

A computer readable storage medium has computer executable instructions stored therein, which, when executed by a process, can implement the method for estimating a frequency offset described above.

People having ordinary skill in the art may understand that all or part of steps in the embodiments described above can be carried out by using computer programs, which can be stored in a computer readable storage medium. The computer programs, when executed on the corresponding hardware platform (such as system, device, apparatus and component and so on), include one or a combination of steps in the method embodiments.

In an exemplary embodiment, all or part of steps in the embodiments described above can be carried out by using integrated circuits. These steps can be implemented by making them one by one into individual integrated circuit modules or by making a plurality of modules thereof into a single integrated circuit module.

Various apparatuses/functional modules/functional units in the embodiments described above, which can be implemented by using general computing apparatuses, can be centralized on a single computing apparatus or distributed on a network formed by multiple computing apparatuses.

Various apparatuses/functional modules/functional units in the embodiments described above, when implemented in a form of software functional module and sold or used as stand-stone products, can be stored in a computer readable storage medium. The computer readable storage medium mentioned above may be a read-only memory, a magnetic disk or an optic disk or the like.

INDUSTRIAL APPLICABILITY

In the scheme of embodiments of the present disclosure, frequency offset is measured by using discontinuously distributed pilot symbols, such as comb-distributed pilot symbols, and the frequency offset is measured by using effectively the frequency domain data leaked on the adjacent subcarriers during the measurement, to ensure well the frequency offset estimation performance under the circumstance that the pilot symbols are distributed discontinuously. Moreover, the precision of the frequency offset measurement of the target user is improved by cancelling or reducing interference between users.

What is claimed is:

1. A method for estimating a frequency offset comprising:
reconstructing an estimated channel value of a target user and an estimated channel value of a non-target user to obtain a reconstructed estimated channel value of the target user and a reconstructed estimated channel value of the non-target user;
calculating frequency domain received data of a target user's local pilot frequency at which interference has been cancelled by using frequency domain data of a subcarrier occupied by the target user, frequency domain data of a subcarrier occupied by the non-target user, and the reconstructed estimated channel value of the target user and the reconstructed estimated channel value of the non-target user; and
determining an estimated frequency offset value by using the target user's local pilot frequency at which interference has been cancelled and the frequency domain received data.

2. The method for estimating a frequency offset according to claim 1, wherein the reconstructing an estimated channel value of a target user and an estimated channel value of a non-target user to obtain a reconstructed estimated channel value of the target user and a reconstructed estimated channel value of the non-target user comprises:
calculating an estimated channel value of a resource occupied by the adjacent non-target user by using the estimated channel value of the target user in a resource block occupied by the target user, and determining the reconstructed estimated channel value of the target user by using the estimated channel value of the target user and the estimated channel value of the resource occupied by the adjacent non-target user; and
calculating estimated channel values of resources occupied by other users adjacent to the non-target user by using the estimated channel value of the non-target user in a resource block occupied by the non-target user, and determining the reconstructed estimated channel value of the non-target user by using the estimated channel value of the non-target user and the estimated channel values of the resources occupied by the other users.

3. The method for estimating a frequency offset according to claim 1, wherein the calculating frequency domain received data of a target user's local pilot frequency at which interference has been cancelled comprises:
when a channel of the target user and a channel of the non-target user are orthogonal or weakly correlative, performing a conjugate correlation operation on the frequency domain data of the target user and the reconstructed estimated channel value of the target user to obtain the frequency domain received data of the target user's local pilot frequency at which interference has been cancelled.

4. The method for estimating a frequency offset according to claim 1, wherein the calculating frequency domain received data of a target user's local pilot frequency at which interference has been cancelled further comprises:

when both the target user and the non-target user are comb-division users and there is a strong correlation between the channel of the target user and the channel of the non-target user, cancelling interference data of the non-target user on an adjacent subcarrier of the target user by using the reconstructed estimated channel value of the non-target user, to obtain the frequency domain received data of the target user's local pilot frequency at which interference has been cancelled.

5. The method for estimating a frequency offset according to claim 4, wherein the cancelling interference data of the non-target user on an adjacent subcarrier of the target user by using the reconstructed estimated channel value of the non-target user comprises:

calculating an orthogonalization factor by using the reconstructed estimated channel value of the target user and the reconstructed estimated channel value of the non-target user, and performing an orthogonalization processing on the channel of the non-target user by using the orthogonalization factor such that the channel of the target user is orthogonal to the channel of the non-target user to cancel interference of the frequency domain data of the non-target user to the adjacent subcarrier of the target user during transmission.

6. The method for estimating a frequency offset according to claim 1, wherein the determining an estimated frequency offset value by using the target user's local pilot frequency at which interference has been cancelled and the frequency domain received data comprises:

reconstructing the local pilot frequency of the target user to obtain a reconstructed local pilot frequency sequence;

performing a frequency-time transform on the target user's local pilot frequency at which interference has been cancelled and the frequency domain received data and the reconstructed local pilot frequency sequence respectively, to obtain time domain received data and a time domain data sequence of the local pilot frequency; and measuring a frequency offset by using the obtained time domain received data and the time domain data sequence of the local pilot frequency to obtain the estimated frequency offset value.

7. The method for estimating a frequency offset according to claim 6, wherein the reconstructing the local pilot frequency of the target user to obtain a reconstructed local pilot frequency sequence and the performing a frequency-time transform on the reconstructed local pilot frequency sequence to obtain a time domain data sequence of the local pilot frequency comprises:

reconstructing directly a local pilot frequency of the target user to obtain the reconstructed local pilot frequency sequence; and performing the frequency-time transform on the reconstructed local pilot frequency sequence to obtain the time domain data sequence of the local pilot frequency; or reconstructing a local mother-code sequence of the target user to obtain a reconstructed local mother-code sequence; and performing the frequency-time transform and a cyclic shift operation on the reconstructed local mother-code sequence to obtain the time domain data sequence of the local pilot frequency.

8. The method for estimating a frequency offset according to claim 6, wherein the measuring a frequency offset by using the obtained time domain received data and the time domain data sequence of the local pilot frequency to obtain the estimated frequency offset value further comprises:

performing a conjugate correlation operation on the time domain received data and the time domain data sequence of the local pilot frequency to obtain a phase sequence of a time domain, and determining the estimated frequency offset value by using the phase sequence of the time domain.

9. A computer readable storage medium where computer executable instructions are stored, which, when executed by a processor, implement the method according to claim 1.

10. The method for estimating a frequency offset according to claim 1, wherein the calculating frequency domain received data of a target user's local pilot frequency at which interference has been cancelled further comprises:

when both the target user and the non-target user are code-division users and there is a strong correlation between the channel of the target user and the channel of the non-target user, processing the frequency domain data of the subcarrier occupied by the target user, the frequency domain data of the subcarrier occupied by the non-target user, and the reconstructed estimated channel value of the target user and the reconstructed estimated channel value of the non-target user by using a minimum mean square error algorithm or a zero forcing algorithm, to obtain frequency domain received data of the subcarrier occupied by the target user and frequency domain received data leaked by the target user on the subcarrier occupied by the adjacent non-target user.

11. The method for estimating a frequency offset according to claim 10, wherein the calculating frequency domain received data of a target user's local pilot frequency at which interference has been cancelled further comprises:

calculating an orthogonalization factor by using the reconstructed estimated channel value of the target user and the reconstructed estimated channel value of the non-target user, and performing an orthogonalization processing on the channel of the non-target user by using the orthogonalization factor such that the channel of the target user is orthogonal to the channel of the non-target user to cancel interference of the frequency domain data of the non-target user to the adjacent subcarrier of the target user during transmission.

12. An apparatus for estimating a frequency offset comprising:

a reconstruction module configured to reconstruct an estimated channel value of a target user and an estimated channel value of a non-target user to obtain a reconstructed estimated channel value of the target user and a reconstructed estimated channel value of the non-target user;

an interference cancellation module configured to calculate frequency domain received data of a target user's local pilot frequency at which interference has been cancelled by using frequency domain data of a subcarrier occupied by the target user, frequency domain data of a subcarrier occupied by the non-target user, and the reconstructed estimated channel value of the target user and the reconstructed estimated channel value of the non-target user; and a frequency offset estimation module configured to determine an estimated frequency offset value by using the target user's local pilot frequency at which interference has been cancelled and the frequency domain received data.

13. The apparatus for estimating a frequency offset according to claim 12, wherein the reconstruction module comprises:
   a first reconstruction submodule configured to calculate an estimated channel value of a resource occupied by the adjacent non-target user by using the estimated channel value of the target user in a resource block occupied by the target user, and determine the reconstructed estimated channel value of the target user by using the estimated channel value of the target user and the estimated channel value of the resource occupied by the adjacent non-target user; and
   a second reconstruction submodule configured to calculate estimated channel values of resources occupied by other users adjacent to the non-target user by using the estimated channel value of the non-target user in a resource block occupied by the non-target user, and determine the reconstructed estimated channel value of the non-target user by using the estimated channel value of the non-target user and the estimated channel values of the resources occupied by the other users.

14. The apparatus for estimating a frequency offset according to claim 12, wherein the interference cancellation module calculating the frequency domain received data of the target user's local pilot frequency at which interference has been cancelled comprises: when a channel of the target user and a channel of the non-target user are orthogonal or weakly correlative, performing a conjugate operation on the frequency domain data of the target user and the reconstructed estimated channel value of the target user to obtain the frequency domain received data of the target user's local pilot frequency at which interference has been cancelled.

15. The apparatus for estimating a frequency offset according to claim 12, wherein the interference cancellation module calculating the frequency domain received data of the target user's local pilot frequency at which interference has been cancelled further comprises: when both the target user and the non-target user are comb-division users and there is a strong correlation between the channel of the target user and the channel of the non-target user, cancelling interference data of the non-target user on an adjacent subcarrier of the target user by using the reconstructed estimated channel value of the non-target user, to obtain the frequency domain received data of the target user's local pilot frequency at which interference has been cancelled; or when both the target user and the non-target user are code-division users and there is a strong correlation between the channel of the target user and the channel of the non-target user, processing the frequency domain data of the subcarrier occupied by the target user, the frequency domain data of the subcarrier occupied by the non-target user, and the reconstructed estimated channel value of the target user and the reconstructed estimated channel value of the non-target user by using a minimum mean square error algorithm or a zero forcing algorithm, to obtain frequency domain received data of the subcarrier occupied by the target user and frequency domain received data leaked by the target user on the subcarrier occupied by the adjacent non-target user.

16. The apparatus for estimating a frequency offset according to claim 15, wherein the interference cancellation module calculating the frequency domain received data of the target user's local pilot frequency at which interference has been cancelled further comprises: calculating an orthogonalization factor by using the reconstructed estimated channel value of the target user and the reconstructed estimated channel value of the non-target user, and performing an orthogonalization processing on the channel of the non-target user by using the orthogonalization factor such that the channel of the target user is orthogonal to the channel of the non-target user to cancel interference of the frequency domain data of the non-target user to the adjacent subcarrier of the target user during transmission.

17. The apparatus for estimating a frequency offset according to claim 12, wherein the frequency offset estimation module determining the estimated frequency offset value by using the target user's local pilot frequency at which interference has been cancelled and the frequency domain received data comprises: reconstructing the local pilot frequency of the target user to obtain a reconstructed local pilot frequency sequence; performing a frequency-time transform on the target user's local pilot frequency at which interference has been cancelled and the frequency domain received data and the reconstructed local pilot frequency sequence respectively, to obtain time domain received data and a time domain data sequence of the local pilot frequency, and measuring a frequency offset by using the obtained time domain received data and the time domain data sequence of the local pilot frequency to obtain the estimated frequency offset value.

18. The apparatus for estimating a frequency offset according to claim 17, wherein the frequency offset estimation module reconstructing the local pilot frequency of the target user to obtain a reconstructed local pilot frequency sequence and performing a frequency-time transform on the reconstructed local pilot frequency sequence to obtain a time domain data sequence of the local pilot frequency comprises:
   reconstructing directly a local pilot frequency of the target user to obtain the reconstructed local pilot frequency sequence; and performing the frequency-time transform on the reconstructed local pilot frequency sequence to obtain the time domain data sequence of the local pilot frequency; or
   reconstructing a local mother-code sequence of the target user to obtain a reconstructed local mother-code sequence, and performing a frequency-time transform and a cyclic shift operation on the reconstructed local mother-code sequence to obtain the time domain data sequence of the local pilot frequency.

19. The apparatus for estimating a frequency offset according to claim 17, wherein the frequency offset estimation module determining the estimated frequency offset by using the target user's local pilot frequency at which interference has been cancelled and the frequency domain received data further comprises: performing a conjugate correlation operation on the time domain received data and the time domain data sequence of the local pilot frequency to obtain a phase sequence of a time domain, and determining the estimated frequency offset value by using the phase sequence of the time domain.

* * * * *